May 11, 1943.  A. WARMISHAM ET AL  2,319,171
OPTICAL OBJECTIVE
Filed Dec. 15, 1941   2 Sheets-Sheet 1

INVENTORS
A. WARMISHAM
G.G. WYNNE
BY Blair + Kilcoyne
ATTORNEYS

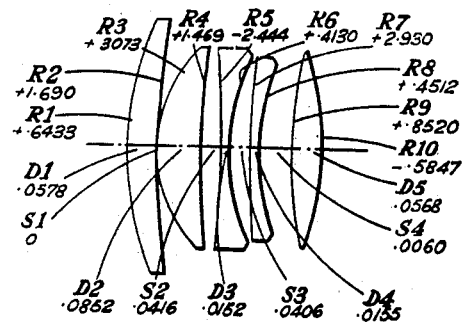
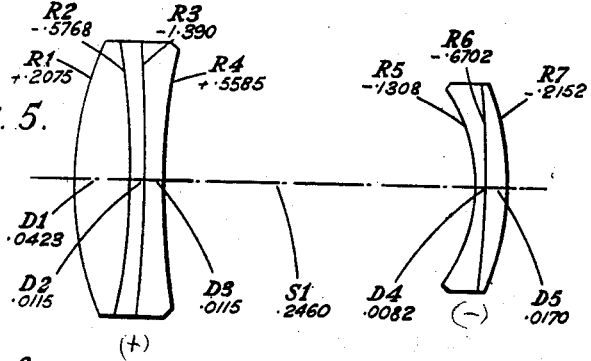
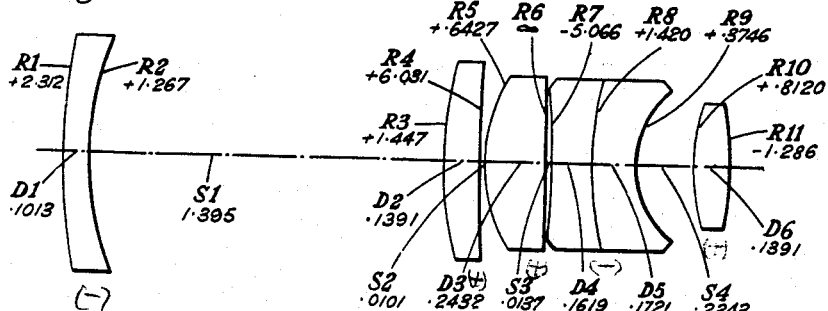
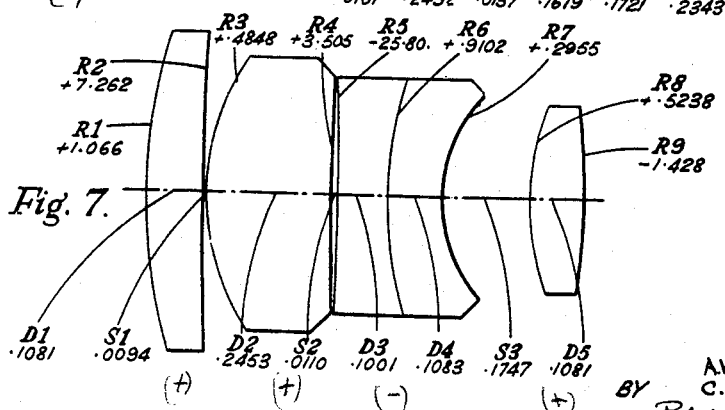

Patented May 11, 1943

2,319,171

UNITED STATES PATENT OFFICE 2,319,171

OPTICAL OBJECTIVE

Arthur Warmisham and Charles Gorrie Wynne, Leicester, England, assignors to Taylor, Taylor & Hobson Limited, Leicester, England, a company of Great Britain Application December 15, 1941, Serial No. 423,118
In Great Britain December 2, 1940

17 Claims. (Cl. 88—57)

This invention relates to optical objectives for photographic or like purposes, comprising two or more divergent elements and two or more convergent elements, and corrected for spherical and chromatic aberrations, coma, astigmatism, curvature of field and distortion, and having small zonal spherical aberration.

It is well-known to provide paraxial chromatic correction in a doublet in respect of two colours, for example red and green, by the use of an appropriate combination of crown and flint glass, but owing to the different relative partial dispersions of the two kinds of glass the correction does not extend throughout the spectrum, and there is a residual colour aberration known as secondary spectrum. Reasonably good correction can be obtained in the well-known triplet objective, which however does not provide correction for field curvature or astigmatism.

The present invention has for its object to provide good correction for secondary spectrum in a photographic or like objective having small zonal spherical aberration without sacrificing correction for astigmatism, field curvature and distortion.

The necessary conditions can be expressed mathematically as follows. If $f_p$ and $m_p$ are respectively the focal length and the magnification of a lens element $p$ having refractive indices $n_C$ $n_D$ $n_e$ $n_F$ $n_g$ respectively for the lines C D e F g Abbe $\nu$ number $$\nu_p\left(\frac{n_D-1}{n_F-n_C}\right)$$

and relative partial dispersion $$\theta_p\left(\frac{n_g-n_e}{n_F-n_C}\right)$$

then good secondary spectrum correction is obtained if $$\sum \frac{m^2_p}{f_p} \cdot \frac{1}{\nu_p} = 0$$

and $$\sum \frac{m^2_p}{f_p} \cdot \frac{\theta_p}{\nu_p} = 0$$

for all the elements of the objective. It should be made clear that the magnification $m_p$, herein referred to, may be defined as being equal to the ratio $h_p/h_1$, where $h_p$ and $h_1$ are respectively the ordinates of the points of intersection with the lens element $p$ and with the first lens element of a paraxial ray of the wave-length of the D-line through the conjugate points for which the objective is corrected.

In the objective according to the invention one of the divergent elements is made of an alkaline halide crystal and the remaining elements are all made of optical glass. Preferably the other divergent element, or one of the other divergent elements, is made of a dense flint glass, whilst at least one of the convergent elements is made of a glass having an Abbe $\nu$ number less than 50.

It is to be understood that the terms "front" and "rear" are herein used to relate to the sides of the objective respectively nearer to and further from the longer conjugate in accordance with the usual convention.

Fig. 4 is a corresponding view showing another modification of the invention.

Fig. 5 is a corresponding view showing another modification of the invention.

Fig. 6 is a corresponding view showing another modification of the invention.

Fig. 7 is a corresponding view of another modification of the invention.

Figure 1:
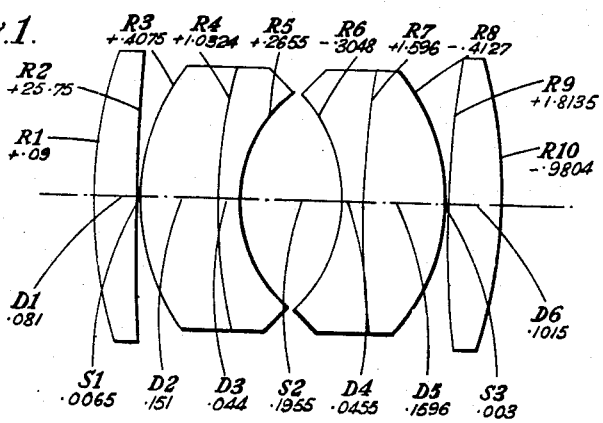
Fig. 1 is a sectional view of an objective embodying one form of the invention.
Figure 2:
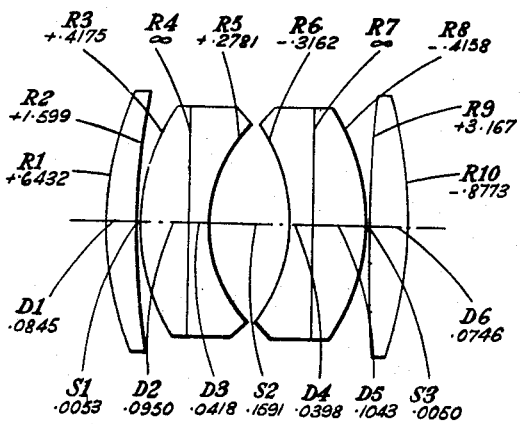
Fig. 2 is a corresponding view showing a modified form of the invention.
Figure 3:
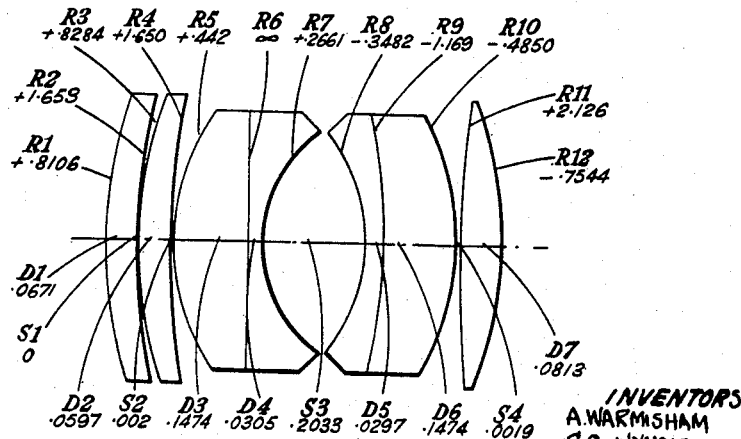
Fig. 3 is a corresponding view showing another modification of the invention.

The invention may be applied to photographic or like objectives of various types, and seven practical examples of objective according thereto are illustrated respectively in the seven figures of the accompanying drawings. Numerical data for these examples are given in the following tables in which $R_1$ $R_2$ ... represent the radii of curvature of the individual lens surfaces counting from the front, the positive sign indicating that the surface is convex to the front and the negative sign that it is concave thereto, $D_1$ $D_2$ ... represent the axial thicknesses of the individual lens elements, and $S_1$ $S_2$ ... represent the axial lengths of the air gaps between the components. The tables also give the mean refractive indices $n_D$, the Abbe $\nu$ numbers, and the relative partial dispersions for the intervals (e to g)/(C to F) of the glasses or crystals used for the individual elements.

The first two examples relate to objectives of the type comprising two compound divergent meniscus components having their concave surfaces facing one another and located between two simple convergent components.

Example I

Equivalent focal length 1.000   Relative aperture f/2

| Radius | Thickness or separation | Refractive index $n_D$ | Abbe $\nu$ number | Relative partial dispersion $\frac{e-g}{C-F}$ |
|---|---|---|---|---|
| $R_1=+\ .90$ | | | | |
| | $D_1=.081$ | 1.6128 | 59.6 | 1.00 |
| $R_2=+25.75$ | | | | |
| | $S_1=.0065$ | | | |
| $R_3=+\ .4075$ | | | | |
| | $D_2=.151$ | 1.6128 | 59.6 | 1.00 |
| $R_4=+\ 1.0324$ | | | | |
| | $D_3=.044$ | 1.6136 | 37.3 | 1.05 |
| $R_5=+\ .2655$ | | | | |
| | $S_2=.1955$ | | | |
| $R_6=-\ .3048$ | | | | |
| | $D_4=.0455$ | 1.6410 | 29.9 | .985 |
| $R_7=+\ 1.596$ | | | | |
| | $D_5=.1596$ | 1.6423 | 48.3 | 1.02 |
| $R_8=-\ .4127$ | | | | |
| | $S_3=.003$ | | | |
| $R_9=+\ 1.8135$ | | | | |
| | $D_6=.1015$ | 1.6423 | 48.3 | 1.02 |
| $R_{10}=-\ .9804$ | | | | |

In this example sodium bromide is used for the rear divergent element and dense flint glass for the front divergent element, the two front convergent elements being of dense barium crown glass and the two rear convergent elements being of dense barium flint glass. This example gives a very marked improvement in secondary spectrum correction over known objectives of similar type using glass throughout. Thus between the C and F lines the wave surface retardation is $+.05\lambda$ at the edge and $-.02\lambda$ at an intermediate zone (.7 of edge aperture) as contrasted with $-.93\lambda$ and $-.64\lambda$ respectively for a typical objective using glass, and the corresponding figures between the $e$ and $g$ lines are $-.06\lambda$ and $-.03\lambda$ as contrasted with $+1.33\lambda$ and $+.39\lambda$. Similar results can also be obtained with the use of potassium iodide or rubidium iodide instead of sodium bromide.

Instead of using the crystal for the rear divergent element, it may be used for the front divergent element, but in this case a crystal of lower refractive index, such as potassium bromide should preferably be used. Data for one such example are given in the following table:

Example II

Equivalent focal length 1.000   Relative aperture f/2.0

| Radius | Thickness or separation | Refractive index $n_D$ | Abbe $\nu$ number | Relative partial dispersion $\frac{e-g}{C-F}$ |
|---|---|---|---|---|
| $R_1=+\ .6432$ | | | | |
| | $D_1=.0845$ | 1.644 | 48.3 | 1.02 |
| $R_2=+1.599$ | | | | |
| | $S_1=.0053$ | | | |
| $R_3=+\ .4175$ | | | | |
| | $D_2=.0950$ | 1.644 | 48.3 | 1.02 |
| $R_4=\infty$ | | | | |
| | $D_3=.0418$ | 1.558 | 31.5 | 1.00 |
| $R_5=+\ .2781$ | | | | |
| | $S_2=.1591$ | | | |
| $R_6=-\ .3162$ | | | | |
| | $D_4=.0398$ | 1.651 | 33.5 | 1.07 |
| $R_7=\infty$ | | | | |
| | $D_5=.1043$ | 1.644 | 48.3 | 1.02 |
| $R_8=-\ .4158$ | | | | |
| | $S_3=.0050$ | | | |
| $R_9=+3.167$ | | | | |
| | $D_6=.0746$ | 1.644 | 48.3 | 1.02 |
| $R_{10}=-.8773$ | | | | |

In this example the two convergent components and the convergent elements of the second and third components are all made of dense barium flint glass. The divergent element of the second component is made of potassium bromide crystal, and the divergent element of the third component is made of dense flint glass.

The third example is applied to an objective of the type comprising two compound divergent meniscus components located behind two simple convergent components and in front of a third simple convergent component.

Example III

Equivalent focal length 1.000   Relative aperture f/1.4

| Radius | Thickness or separation | Refractive index $n_D$ | Abbe $\nu$ number | Relative partial dispersion $\frac{e-g}{C-F}$ |
|---|---|---|---|---|
| $R_1=+\ .8106$ | | | | |
| | $D_1=.0671$ | 1.613 | 59.6 | 1.00 |
| $R_2=+1.653$ | | | | |
| | $S_1=0$ | | | |
| $R_3=+\ .8284$ | | | | |
| | $D_2=.0597$ | 1.613 | 59.6 | 1.00 |
| $R_4=+1.650$ | | | | |
| | $S_2=.002$ | | | |
| $R_5=+\ .442$ | | | | |
| | $D_3=.1474$ | 1.644 | 48.3 | 1.02 |
| $R_6=\infty$ | | | | |
| | $D_4=.0305$ | 1.621 | 36.1 | 1.05 |
| $R_7=+\ .2661$ | | | | |
| | $S_3=.2033$ | | | |
| $R_8=-\ .3482$ | | | | |
| | $D_5=.0297$ | 1.6634 | 21.3 | .987 |
| $R_9=-1.169$ | | | | |
| | $D_6=.1474$ | 1.644 | 48.3 | 1.02 |
| $R_{10}=-\ .4854$ | | | | |
| | $S_4=.0019$ | | | |
| $R_{11}=+2.126$ | | | | |
| | $D_7=.0813$ | 1.644 | 48.3 | 1.02 |
| $R_{12}=-\ .7544$ | | | | |

This example has potassium iodide for the rear divergent element and dense flint glass for the front divergent element, and gives a considerable improvement in secondary spectrum correction over known objectives of similar type using glass throughout. Thus between the C and F lines the wave retardation is $-.10\lambda$ at the edge and $+.10\lambda$ at an intermediate zone (.7 of edge aperture) as contrasted with $-1.91\lambda$ and $-1.13\lambda$ respectively for a typical known objective, the corresponding figures between $e$ and $g$ lines being $+.07\lambda$ and $+.20\lambda$ as contrasted with $+2.34\lambda$ and $+.77\lambda$.

The fourth example relates to an objective of the type comprising two simple divergent components located behind two simple convergent components and in front of a third simple convergent component.

Example IV

Equivalent focal length 1.000   Relative aperture f/2.5

| Radius | Thickness or separation | Refractive index $n_D$ | Abbe $\nu$ number | Relative partial dispersion $\frac{e-g}{C-F}$ |
|---|---|---|---|---|
| $R_1=+\ .6433$ | | | | |
| | $D_1=.0578$ | 1.644 | 48.3 | 1.025 |
| $R_2=+1.690$ | | | | |
| | $S_1=0$ | | | |
| $R_3=+\ .3707$ | | | | |
| | $D_2=.0852$ | 1.613 | 53.3 | 1.016 |
| $R_4=+1.469$ | | | | |
| | $S_2=.0416$ | | | |
| $R_5=-2.444$ | | | | |
| | $D_3=.0152$ | 1.652 | 33.5 | 1.060 |
| $R_6=+\ .4130$ | | | | |
| | $S_3=.0406$ | | | |
| $R_7=+2.930$ | | | | |
| | $D_4=.0155$ | 1.641 | 29.9 | .985 |
| $R_8=+\ .4512$ | | | | |
| | $S_4=.0660$ | | | |
| $R_9=+\ .8520$ | | | | |
| | $D_5=.0568$ | 1.644 | 48.3 | 1.025 |
| $R_{10}=-\ .5847$ | | | | |

This example uses sodium bromide for the divergent fourth element and dense flint glass for the divergent third element, whilst the convergent front and rear elements are made of dense barium flint glass and the convergent second element of dense barium crown glass.

The fifth example is of the type known as a telephoto objective wherein known examples using glass throughout have suffered from serious secondary spectrum. Such objectives usually consist of a pair of meniscus doublets with their concave surfaces facing one another, but in the present example the front component consists of a divergent element cemented between a front convergent element and a rear divergent element, the rear component consisting of a divergent element cemented in front of a convergent element.

Example V

Equivalent focal length 1.000      Relative aperture f/5.6

| Radius | Thickness or separation | Refractive index $n_D$ | Abbe $\nu$ number | Relative partial dispersion $\frac{e-g}{C-F}$ |
|---|---|---|---|---|
| $R_1=+.2075$ | | | | |
| $R_2=-.5768$ | $D_1=.0423$ | 1.5732 | 51.9 | 1.012 |
| $R_3=-1.390$ | $D_2=.0115$ | 1.6634 | 21.3 | .987 |
| $R_4=+.5585$ | $D_3=.0115$ | 1.652 | 33.5 | 1.07 |
| $R_5=-.1308$ | $S_1=.2460$ | | | |
| $R_6=-.6702$ | $D_4=.0082$ | 1.509 | 64.3 | .994 |
| $R_7=-.2152$ | $D_5=.0170$ | 1.613 | 36.9 | 1.051 |

This example uses potassium iodide crystal for the divergent middle element of the front component and dense flint glass for the divergent rear element of the front component as also for the convergent rear element of the rear component, the front elements of the first and second components being respectively made of light barium flint and crown glasses.

This example may be modified by employing the crystal for the rear element of the front component and the dense flint glass for the middle element, or again by making the rear component of triplet construction and the front component of doublet construction with the crystal as one of the elements, preferably the middle element, of the rear component.

According to a further feature of the invention an objective of known type having at least one divergent element and two or more convergent elements is modified to afford correction for secondary spectrum by replacing the divergent element (or one of the divergent elements) by two divergent elements compounded together, one of such elements being made of an alkaline halide crystal, whilst the other and also the remaining elements of the objective are made of optical glass. The divergent element compounded with the crystal element is preferably made of dense flint glass.

Examples VI and VII, of which data are given below, are two such arrangements, (whose analogues form the subject respectively of the present applicant's copending United States patent applications Serial Nos. 364,453 and 401,648) and retain the advantages of such prior objectives with the added advantage in each case of greatly improved correction for secondary spectrum.

Example VI

Equivalent focal length 1.000      Relative aperture f/1.4

| Radius | Thickness or air separation | Refractive index $n_D$ | Abbe $\nu$ number | Relative partial dispersion $\frac{e-g}{C-F}$ |
|---|---|---|---|---|
| $R_1=+2.312$ | $D_1=.1013$ | 1.516 | 64.1 | .988 |
| $R_2=+1.267$ | $S_1=1.395$ | | | |
| $R_3=+1.447$ | $D_2=.1391$ | 1.6125 | 37.3 | 1.051 |
| $R_4=+6.031$ | $S_2=.0101$ | | | |
| $R_5=+.6427$ | $D_3=.2432$ | 1.6125 | 59.6 | .999 |
| $R_6=\infty$ | $S_3=.0137$ | | | |
| $R_7=-5.066$ | $D_4=.1619$ | 1.6973 | 30.5 | 1.067 |
| $R_8=+1.420$ | $D_5=.1721$ | 1.6634 | 21.4 | .988 |
| $R_9=+.3746$ | $S_4=.2343$ | | | |
| $R_{10}=+.8120$ | $D_6=.1391$ | 1.6216 | 60.2 | .998 |
| $R_{11}=-1.286$ | | | | |

Example VII

Equivalent focal length 1.000      Relative aperture f/1.4

| Radius | Thickness or air separation | Refractive index $n_D$ | Abbe $\nu$ number | Relative partial dispersion $\frac{e-g}{C-F}$ |
|---|---|---|---|---|
| $R_1=+1.066$ | $D_1=.1081$ | 1.6135 | 59.6 | .999 |
| $R_2=+7.262$ | $S_1=.0094$ | | | |
| $R_3=+.4848$ | $D_2=.2453$ | 1.5732 | 51.9 | 1.012 |
| $R_4=+3.505$ | $S_2=.0110$ | | | |
| $R_5=-25.80$ | $D_3=.1001$ | 1.7492 | 27.8 | 1.078 |
| $R_6=+.9102$ | $D_4=.1083$ | 1.6634 | 21.4 | .988 |
| $R_7=+.2955$ | $S_3=.1747$ | | | |
| $R_8=+.5238$ | $D_5=.1081$ | 1.613 | 37.3 | 1.051 |
| $R_9=-1.428$ | | | | |

In the sixth example the objective comprises five components of which the first and fourth are divergent and the others convergent, the fourth component being compound and consisting of two divergent elements, whilst the remaining four components all consist of simple elements. Potassium iodide crystal is used for the rear element of the fourth component and dense flint glass for the front element thereof. Dense flint glass is also used for the convergent second component, the other two convergent components being made of dense barium crown glass, whilst barium silicate crown glass is used for the divergent front component.

In the seventh example the objective comprises a divergent compound component located behind two simple convergent components and in front of a third simple convergent component, the front and rear divergent elements of the divergent third component being made respectively of dense flint glass and of potassium iodide crystal. The convergent front component is made of dense barium crown glass, and the convergent second component of light barium flint glass, whilst dense flint glass is used for the convergent rear component.

It will be appreciated that the foregoing examples may be modified in various ways within the scope of the invention, for instance by the use of other high index alkaline halide crystals in place of the potassium iodide crystal described.

What we claim as our invention and desire to secure by Letters Patent is:

1. An optical objective corrected for spherical and chromatic aberrations, coma, astigmatism, field curvature and distortion, and having small zonal spherical aberration, and comprising at least two divergent elements and at least two convergent elements in axial alignment, one of the divergent elements being made of an alkaline halide crystal whilst all the other elements of the objective are made of optical glass . . . , the objective approximately fulfilling the two equations $$\sum \frac{m^2_p}{f_p} \cdot \frac{1}{\nu_p} = 0 \text{ and } \sum \frac{m^2_p}{f_p} \cdot \frac{\theta_p}{\nu_p} = 0$$

wherein $m_p$, $f_p$ $\nu_p$ and $\theta_p$ respectively represent the magnification, the focal length, the Abbé $\nu$ number and the relative partial dispersion of an element $p$ of the objective and the symbol $\Sigma$ indicates algebraic summation of the expressions for all the elements of the objective.

2. An optical objective corrected for spherical and chromatic aberrations, coma, astigmatism, field curvature and distortion, and having small zonal spherical aberration, and comprising at least two divergent elements and at least two convergent elements in axial alignment, one of the divergent elements being made of an alkaline halide crystal and another of a dense flint glass, whilst at least one of the convergent elements is made of a glass having an Abbe $\nu$ number less than 50 . . . , the objective approximately fulfilling the two equations $$\sum \frac{m^2_p}{f_p} \cdot \frac{1}{\nu_p} = 0 \text{ and } \sum \frac{m^2_p}{f_p} \cdot \frac{\theta_p}{\nu_p} = 0$$

wherein $m_p$, $f_p$ $\nu_p$ and $\theta_p$ respectively represent the magnification, the focal length, the Abbé $\nu$ number and the relative partial dispersion of an element $p$ of the objective and the symbol $\Sigma$ indicates algebraic summation of the expressions for all the elements of the objective.

3. An optical objective corrected for spherical and chromatic aberrations, coma, astigmatism, field curvature and distortion and having small zonal spherical aberration, and comprising two compound divergent meniscus components with their concave air-exposed surfaces facing one another each consisting of a convergent element cemented to a divergent element, and at least one convergent component on either side of the pair of divergent components, one of the divergent elements being made of an alkaline halide crystal, whilst all the other elements of the objective are made of optical glass . . . , the objective approximately fulfilling the two equations $$\sum \frac{m^2_p}{f_p} \cdot \frac{1}{\nu_p} = 0 \text{ and } \sum \frac{m^2_p}{f_p} \cdot \frac{\theta_p}{\nu_p} = 0$$

wherein $m_p$, $f_p$ $\nu_p$ and $\theta_p$ respectively represent the magnification, the focal length, the Abbé $\nu$ number and the relative partial dispersion of an element $p$ of the objective and the symbol $\Sigma$ indicates algebraic summation of the expressions for all the elements of the objective.

4. An optical objective as claimed in claim 3, in which the other divergent element is made of a dense flint glass and at least one of the convergent elements is made of a glass having and Abbe $\nu$ number less than 50.

5. An optical objective as claimed in claim 3, in which the rear divergent element is made of an alkaline halide crystal having mean refractive index greater than 1.6 and the front divergent element is made of dense flint glass.

6. An optical objective corrected for spherical and chromatic aberrations, coma, astigmatism, field curvature and distortion, and having small zonal spherical aberration, and comprising two compound divergent meniscus elements with their concave air-exposed surfaces facing one another and at least one convergent component on either side of the pair of divergent meniscus components, one divergent component consisting of a divergent element made of an alkaline halide crystal, cemented to a convergent element made of dense barium flint glass, whilst the other divergent component consists of a divergent element made of dense flint glass cemented to a convergent element made of dense barium flint glass . . . , the objective approximately fulfilling the two equations $$\sum \frac{m^2_p}{f_p} \cdot \frac{1}{\nu_p} = 0 \text{ and } \sum \frac{m^2_p}{f_p} \cdot \frac{\theta_p}{\nu_p} = 0$$

wherein $m_p$, $f_p$ $\nu_p$ and $\theta_p$ respectively represent the magnification, the focal length, the Abbé $\nu$ number and the relative partial dispersion of an element $p$ of the objective and the symbol $\Sigma$ indicates algebraic summation of the expressions for all the elements of the objective.

7. An optical objective as claimed in claim 6, in which the rear convergent component is made of dense barium flint glass.

8. An optical objective corrected for spherical and chromatic aberrations, coma, astigmatism, field curvature and distortion, and having small zonal spherical aberration, and comprising four axially aligned components of which the outer pair are convergent and the inner pair each consist of a compound meniscus divergent component having a divergent element cemented to a convergent element, one of the two divergent elements being made of an alkaline halide crystal and the other of a dense flint glass, whilst at least one of the convergent elements is made of a glass having an Abbe $\nu$ number less than 50 and the others are also made of optical glass . . . , the objective approximately fulfilling the two equations $$\sum \frac{m^2_p}{f_p} \cdot \frac{1}{\nu_p} = 0 \text{ and } \sum \frac{m^2_p}{f_p} \cdot \frac{\theta_p}{\nu_p} = 0$$

wherein $m_p$, $f_p$ $\nu_p$ and $\theta_p$ respectively represent the magnification, the focal length, the Abbé $\nu$ number and the relative partial dispersion of an element $p$ of the objective and the symbol $\Sigma$ indicates algebraic summation of the expressions for all the elements of the objective.

9. An optical objective as claimed in claim 8, in which the rear divergent element is made of an alkaline halide crystal having mean refractive index greater than 1.6.

10. An optical objective as claimed in claim 8, in which the convergent front component and the convergent front element of the second component are each made of dense barium crown glass and the divergent elements of the second and third components are respectively made of dense flint glass and of sodium bromide crystal, whilst the convergent rear element of the third component and the convergent rear component are each made of dense barium flint glass.

11. An optical objective as claimed in claim 8, in which the front divergent element is made of an alkaline halide crystal having mean refractive index less than 1.6.

12. An optical objective as claimed in claim 8, in which the front divergent element is made of potassium bromide, and the convergent elements are all made of dense barium flint glass.

13. An optical objective corrected for spherical and chromatic aberrations, coma, astigmatism, field curvature and distortion and having small zonal spherical aberration, and comprising five axially aligned components of which the front two components and the rear component are convergent and the third and fourth components each consist of a compound divergent meniscus component having a convergent element cemented to a divergent element, the rear divergent element being made of an alkaline halide crystal having mean refractive index greater than 1.64 whilst the front divergent element is made of dense flint glass . . . , the objective approximately fulfilling the two equations $$\sum \frac{m^2_p}{f_p} \cdot \frac{1}{\nu_p} = 0 \text{ and } \sum \frac{m^2_p}{f_p} \cdot \frac{\theta_p}{\nu_p} = 0$$

wherein $m_p$, $f_p$, $\nu_p$ and $\theta_p$ respectively represent the magnification, the focal length, the Abbé $\nu$ number and the relative partial dispersion of an element $p$ of the objective and the symbol $\Sigma$ indicates algebraic summation of the expressions for all the elements of the objective.

14. An optical objective as claimed in claim 13, in which the front two convergent components are each made of dense barium crown glass, and the remaining convergent components are made of dense barium flint glass, the rear divergent element being made of potassium iodide crystal.

15. An optional objective having numerical data substantially as set forth in the following table:

Equivalent focal length 1.000        Relative aperture $f/2$

| Radius | Thickness or separation | Refractive index $n_D$ | Abbé $\nu$ number | Relative partial dispersion $\frac{e-g}{C-F}$ |
|---|---|---|---|---|
| $R_1 = +\ .90$ | | | | |
| | $D_1 = .081$ | 1.6128 | 59.6 | 1.00 |
| $R_2 = +25.75$ | | | | |
| | $S_1 = .0065$ | | | |
| $R_3 = +\ .4075$ | | | | |
| | $D_2 = .151$ | 1.6128 | 59.6 | 1.00 |
| $R_4 = +1.0324$ | | | | |
| $R_5 = +\ .2655$ | $D_3 = .044$ | 1.6128 | 37.3 | 1.05 |
| | $S_2 = .1955$ | | | |
| $R_6 = -\ .3048$ | | | | |
| | $D_4 = .0455$ | 1.6410 | 29.9 | .985 |
| $R_7 = +\ 1.596$ | | | | |
| | $D_5 = .1596$ | 1.6423 | 48.3 | 1.02 |
| $R_8 = -\ .4127$ | | | | |
| | $S_3 = .003$ | | | |
| $R_9 = +\ 1.8135$ | | | | |
| | $D_6 = .1015$ | 1.6423 | 48.3 | 1.02 |
| $R_{10} = -\ .9804$ | | | | | wherein $R_1 R_2 \ldots$ indicate the radii of the individual surfaces counting from the front, $D_1 D_2 \ldots$ indicate the axial thicknesses of the individual elements and $S_1 S_2 \ldots$ indicate the axial air separations between the components.

16. An optical objective having numerical data substantially as set forth in the following table:

Equivalent focal length 1.000        Relative aperture $f/2.0$

| Radius | Thickness or separation | Refractive index $n_D$ | Abbé $\nu$ number | Relative partial dispersion $\frac{e-g}{C-F}$ |
|---|---|---|---|---|
| $R_1 = +\ .6432$ | | | | |
| | $D_1 = .0845$ | 1.644 | 48.3 | 1.02 |
| $R_2 = +1.599$ | | | | |
| | $S_1 = .0053$ | | | |
| $R_3 = +\ .4175$ | | | | |
| | $D_2 = .0950$ | 1.644 | 48.3 | 1.02 |
| $R_4 = \infty$ | | | | |
| $R_5 = +\ .2781$ | $D_3 = .0418$ | 1.558 | 31.5 | 1.00 |
| | $S_2 = .1591$ | | | |
| $R_6 = -\ .3162$ | | | | |
| | $D_4 = .0398$ | 1.651 | 33.5 | 1.07 |
| $R_7 = \infty$ | | | | |
| | $D_5 = .1043$ | 1.644 | 48.3 | 1.02 |
| $R_8 = -\ .4158$ | | | | |
| | $S_3 = .0050$ | | | |
| $R_9 = +\ 3.167$ | | | | |
| | $D_6 = .0746$ | 1.644 | 48.3 | 1.02 |
| $R_{10} = -\ .8773$ | | | | | wherein $R_1 R_2 \ldots$ indicate the radii of the individual surfaces counting from the front, $D_1 D_2 \ldots$ indicate the axial thicknesses of the individual elements and $S_1 S_2 \ldots$ indicate the axial air separations between the components.

17. An optical objective having numerical data substantially as set forth in the following table:

Equivalent focal length 1.000        Relative aperture $f/1.4$

| Radius | Thickness or separation | Refractive index $n_D$ | Abbé $\nu$ number | Relative partial dispersion $\frac{e-g}{C-F}$ |
|---|---|---|---|---|
| $R_1 = +\ .8106$ | | | | |
| | $D_1 = .0671$ | 1.613 | 59.6 | 1.00 |
| $R_2 = +1.653$ | | | | |
| | $S_1 = 0$ | | | |
| $R_3 = +\ .8284$ | | | | |
| | $D_2 = .0597$ | 1.613 | 59.6 | 1.00 |
| $R_4 = +1.650$ | | | | |
| | $S_2 = .002$ | | | |
| $R_5 = +\ .442$ | | | | |
| | $D_3 = .1474$ | 1.644 | 48.3 | 1.02 |
| $R_6 = \infty$ | | | | |
| | $D_4 = .0305$ | 1.621 | 36.1 | 1.05 |
| $R_7 = +\ .2661$ | | | | |
| | $S_3 = .2033$ | | | |
| $R_8 = -\ .3482$ | | | | |
| | $D_5 = .0297$ | 1.6634 | 21.3 | .987 |
| $R_9 = -1.169$ | | | | |
| | $D_6 = .1474$ | 1.644 | 48.3 | 1.02 |
| $R_{10} = -\ .4854$ | | | | |
| | $S_4 = .0019$ | | | |
| $R_{11} = +2.126$ | | | | |
| | $D_7 = .0813$ | 1.644 | 48.3 | 1.02 |
| $R_{12} = -\ .7544$ | | | | | wherein $R_1 R_2 \ldots$ indicate the radii of the individual surfaces counting from the front, $D_1 D_2 \ldots$ indicate the axial thicknesses of the individual elements and $S_1 S_2 \ldots$ indicate the axial air separations between the components.

ARTHUR WARMISHAM.
CHARLES GORRIE WYNNE.